United States Patent
Baumgaertel et al.

(10) Patent No.: US 11,256,592 B2
(45) Date of Patent: Feb. 22, 2022

(54) CONTEXTUAL AND ADAPTABLE KEY PERFORMANCE INDICATORS

(71) Applicant: SAP SE, Walldorf (DE)

(72) Inventors: Dirk Baumgaertel, Altlussheim (DE); Sonja Barnet, Viernheim (DE); Raffael Lutz, Bad Schoenborn (DE); Vivek Methi, Anjangaon Surji (IN); Stefan Kraus, Bruchsal (DE); Gaurav Kumar, Madhepura Bihar (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/563,149

(22) Filed: Sep. 6, 2019

(65) Prior Publication Data

US 2021/0073100 A1    Mar. 11, 2021

(51) Int. Cl.
| | |
|---|---|
| G06F 11/34 | (2006.01) |
| G06F 9/48 | (2006.01) |
| G06F 9/451 | (2018.01) |
| G06F 11/30 | (2006.01) |
| G06Q 10/06 | (2012.01) |

(52) U.S. Cl.
CPC ......... G06F 11/3409 (2013.01); G06F 9/451 (2018.02); G06F 9/4843 (2013.01); G06F 11/3024 (2013.01); G06Q 10/06393 (2013.01)

(58) Field of Classification Search
None
See application file for complete search history.

(56) References Cited

U.S. PATENT DOCUMENTS

| | | | |
|---|---|---|---|
| 5,495,571 A * | 2/1996 | Corrie, Jr | G06F 11/3684 714/38.1 |
| 9,367,432 B2 * | 6/2016 | Jivane | G06F 11/3684 |
| 2008/0115103 A1 * | 5/2008 | Datars | G06Q 10/10 717/101 |
| 2012/0029977 A1 * | 2/2012 | Alcorn | G06Q 10/06393 705/7.39 |

* cited by examiner

*Primary Examiner* — Lewis A Bullock, Jr.
*Assistant Examiner* — Mark A Gooray
(74) *Attorney, Agent, or Firm* — Mintz Levin Cohn Ferris Glovsky and Popeo, P.C.

(57) ABSTRACT

A method, a system, and a computer program product for generating and using contextual and adaptable parameters for monitoring of various processes. A plurality of standard parameters for use during execution of a computing process by a computing system are received. At least one standard parameter in the plurality of standard parameters is modified in accordance with one or more contextual features associated with the execution of the computing process. The computing process is executed by the computing system using a combination of at least one standard parameter in the plurality of standard parameters and the at least one modified parameter.

20 Claims, 10 Drawing Sheets

FIG. 5b

CONTEXTUAL AND ADAPTABLE KEY PERFORMANCE INDICATORS

TECHNICAL FIELD

This disclosure relates generally to data processing and, in particular, to contextual and adaptable key performance indicators (KPIs) for process monitoring.

BACKGROUND

Many companies rely on a multitude of computing processes for performing various tasks. Each such computing process may need to be configured in order to execute desired functionalities, transactions, tasks, etc. The computing processes may be executed by various computing systems that may be disposed across a vast operational landscape. Performance and progress of computing processes may be typically measured using various parameters, e.g., key performance indicators. Standard software delivers standard key performance indicators associated with computing processes, which are typically used for that purpose. However, such standard key performance indicators typically do not account for customer-specific of computing environments or user requirements and hence, may be prone to providing inaccurate assessments. Thus, there is a need for a way to effectively define adaptable key performance indicators that may be used for monitoring of various processes.

SUMMARY

In some implementations, the current subject matter relates to a computer implemented method for generating and using contextual and adaptable parameters for monitoring of various processes. The method may include receiving a plurality of standard parameters (such as a set of parameters, a group of parameters, etc.) for use during execution of a computing process by a computing system, modifying at least one standard parameter in the plurality of standard parameters in accordance with one or more contextual features associated with the execution of the computing process, and executing the computing process by the computing system using a combination of at least one standard parameter in the plurality of standard parameters and the at least one modified parameter.

In some implementations, the current subject matter can include one or more of the following optional features. In some implementations, the process may further include filtering the modified standard parameter using at least one filter associated with the execution of the computing process. Execution of the process may further include executing the computing process by the computing system using a combination of at least one standard parameter in the plurality of standard parameters and the filtered modified parameter.

In some implementations, the process may further include receiving a second plurality of standard parameters, and executing the computing process by the computing system using a combination of at least one standard parameter in the plurality of standard parameters, at least one parameter in the second plurality of standard parameters, and the modified parameter. The method may also include monitoring execution of the computing process using the combination of at least one standard parameter in the plurality of standard parameters and the modified parameter, performing additional modification of the modified parameter, and executing the computing process by the computing system using a combination of at least one standard parameter in the plurality of standard parameters and the additionally modified parameter.

In some implementations, the method may further include displaying result of the executing using at least one user interface of the computing system. Further, the standard parameters may include a key performance indicator associated with execution of the computing process.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 5b illustrates an exemplary interface showing exposed filters for a particular parameter (e.g., KPI), according to some implementations of the current subject matter;

DETAILED DESCRIPTION

Figure 1:
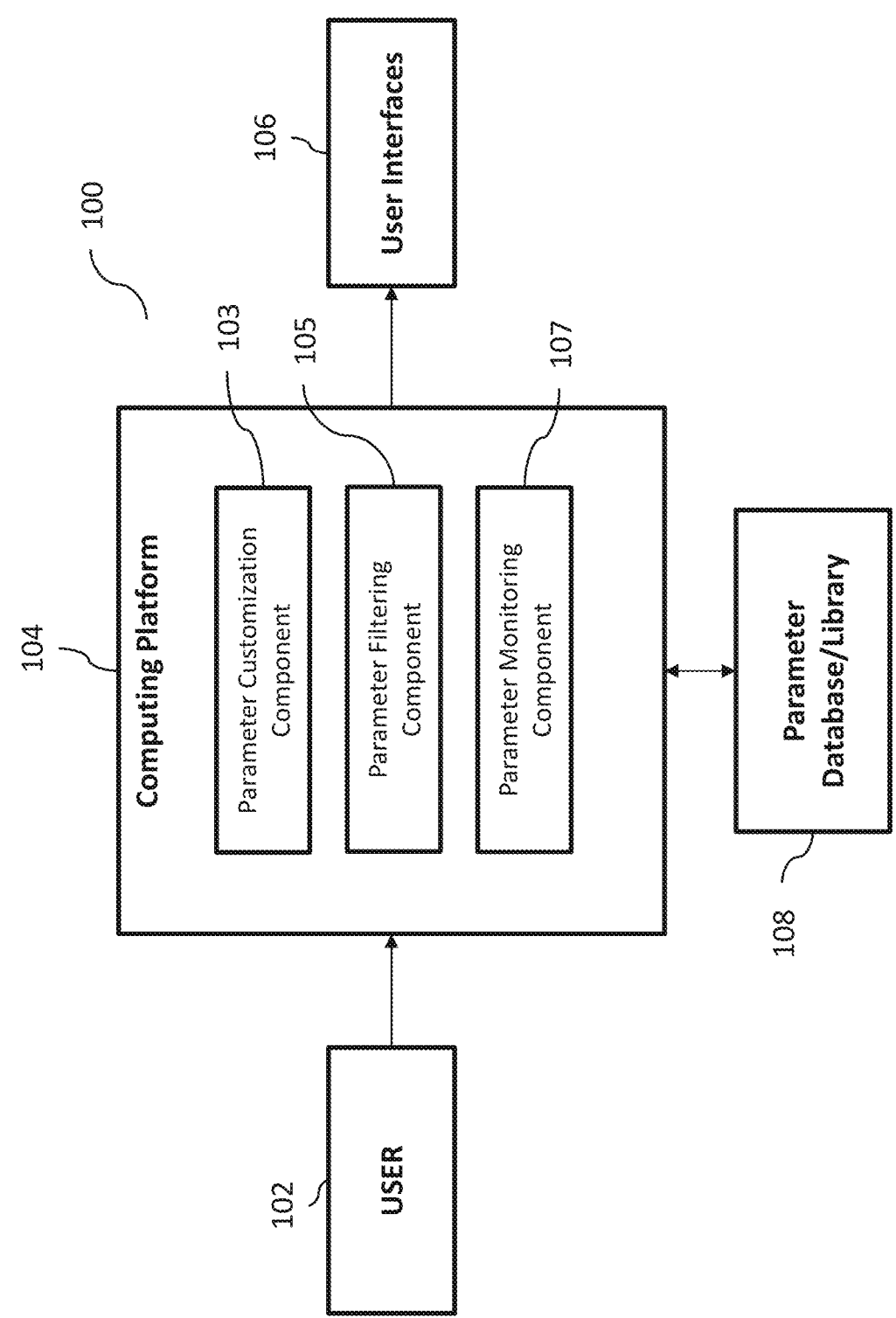
FIG. 1 illustrates an exemplary system for generating and using contextual and adaptable key performance indicators, according to some implementations of the current subject matter.

To address these and potentially other deficiencies of currently available solutions, one or more implementations of the current subject matter relate to methods, systems, articles of manufacture, and the like that can, among other possible advantages, provide an ability to for generation and use of contextual and adaptable key performance indicators (KPIs) that may be used for monitoring of various processes.

A key performance indicator (KPI) of a process may be defined as a measurable value, which may be aggregated and/or filtered to assess a performance of a particular computing process (e.g., revenue of a business segment (consisting of multiple dimensions: departments, customers, products, etc.)) against targets and/or historic values and/or other parameters. Currently, analysis of KPIs of business processes may be performed in one following a classic business intelligence (BI) tool approach, a KPI management framework approach, and an enterprise resource planning (ERP) process analytic approach.

In the classic BI tool approach, a KPI is considered mostly as a dynamically filtered KPI visualization (e.g., a dashboard component). It is dynamically filtered and compares actual values against a target column. Accordingly, a KPI definition is performed on a user interface (UI) layer and part of e.g. a dashboard definition. In the KPI management framework approach, KPI is considered as a management definition represented by an own metadata object that includes independent definitions of data points and evaluation rules. In this case, libraries of standard KPIs are delivered and include significant relevant business knowledge, which needs to be connected to the relevant data sources in operational systems. In the ERP process analytic approach, ERP tools and business applications deliver business process out of the box and need to embed their KPIs into processes. To make them contextual, KPI's are mostly hard coded into different user interfaces to monitor the relevant KPIs closely to process data. Those approaches have the advantage that KPIs are highly contextual but lack the flexibility and adaptability companies need to address company-specific priorities and needs.

A KPI must be properly defined using definitions/metadata description to enable collection of relevant data points and application of consistent evaluation rules. Standard KPIs/industry-specific libraries must be able to be delivered and customized by an end user. It must be possible to extend those KPI by custom filters, which allow to embed those KPIs into multiples contexts (e.g., a dashboard, a factsheet, a business process UI, a mobile phone, etc.) and filter the KPI by relevant variables. At the same time KPIs must run out of the box requiring a life cycle management allowing to ship changes to those KPIs without disrupting productive systems. Further, the KPIs are automatically filtered to the relevant, e.g., time buckets using logical expressions.

The existing computing systems are typically not capable of allowing users to adapt KPIs to their needs. KPIs represent an enormous, industry-specific business knowledge, which may be provided as libraries. This content is valuable as standalone KPI, but also as embedded part in dashboards, object pages and process related UIs. The challenge here is that the delivered analytic content is highly interdependent, but might be incomplete because various selections that may be applied by the user might not be anticipated. Conventional solutions typically implement copy templates that require users rebuild everything on top. Moreover, using existing computing systems, in view of a significant number of KPI definitions being used, it may be difficult to manage or filter many KPIs that may be required. At the same time, the KPIs may need to operate in the context of a filterable dashboard page as well as in the context of process monitoring. Lastly, the existing computing system typically do not allow reuse of KPIs, which may make it difficult to manage and consume KPIs.

In some implementations, to solve the above problems with existing systems, the current subject matter is capable of receiving a plurality of first parameters (or a parameter, or a set of parameters, etc. (referred to as "parameters" herein) (e.g., KPIs associated with one or more computing processes), modifying the received first parameters in accordance with one or more second parameters that may be associated a specific computing environment (e.g., end-user computing system), filtering the modified first parameters using one or more filters defined by one or more computing functions being executed in the computing environment, and monitoring execution of the computing functions in accordance with the filtered modified first parameters. The first parameters may be contextual in nature and may be originally defined for a particular computing process, however, their context may be modified in accordance with specific requirements of the computing process where these parameters are being used for execution and monitoring of computing functions. The first parameters may be provided as a library of parameters and include various dependencies among themselves as well as the computing environment where they are to be used.

In some implementations, the parameters or KPIs may be adapted on a continuous basis (e.g., as soon as new parameters are provided to the computing environment). By way of a non-limiting example, KPIs may be included in a multiple work center overview or dashboard pages (e.g., in financials) and users may consume KPIs. Users may be able to adapt any standard KPIs to their needs. This may allow users to reuse standard KPIs and at the same time, use those KPIs adapted to their needs.

In some exemplary, non-limiting implementations, parameters (e.g., KPIs) may be modified or adapted in one or more of the following ways: users may need to change one or more selections for which a KPI is calculated (e.g., KPI is provided as a monthly KPI, where the user wants to look at quarter, year to date, etc. statistics), users may need to adapt the KPI detail pages showing additional reports for explanations, users may want to apply custom-specific targets or reference values for monitoring, users may need to adapt the rules for how certain thresholds associated with KPIs are determined, etc., users may need to adapt KPI filtering parameters, etc. In some implementations, KPIs may be copied, custom KPIs may be generated, new KPIs may be generated based on specific data, etc.

In some implementations, upon receiving various parameters (e.g., KPIs), a user's system may customize them and/or adapt them to the computing processes that may be executed by the user's computing system. Moreover, the customized parameters (e.g., customized KPIs) may be further filtered using one or more filter (e.g., filtering functions, filter fields, etc.) that may generate further variants of the parameters.

Figure 3:
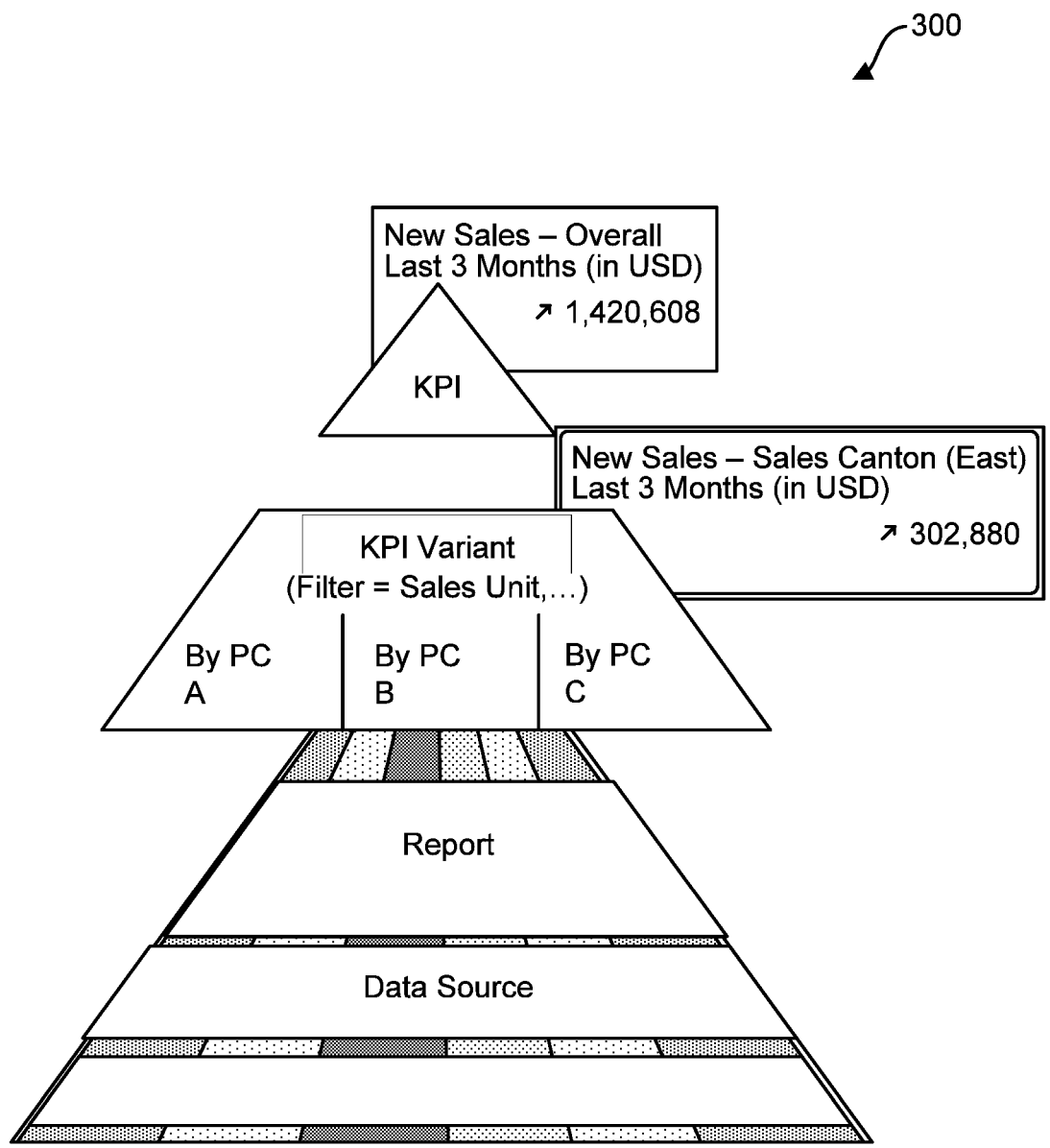
FIG. 3 illustrates an exemplary chart that shows enhancement of KPIs using filtering.

For example, use of filter fields may enhance one or more metadata definitions of a KPI and allow a user to generate one or more KPI variants for possible combinations (e.g., sales units, regions, customer groups, etc.). Customization/filtering of standard KPI may be enhanced by one or more multiple filter fields. FIG. 3 illustrates an exemplary chart 300 that shows enhancement of KPIs using filtering. As shown in FIG. 3, the standard KPI (e.g., New Sales–Overall) may become one or more KPI variants (e.g., user a Filter=Sales Unit, etc.) through filtering and may be independent of the overall selection on which the KPI may be based. This may have one or more of the following advantages. A standard KPI enhanced by additional filter fields may be reused and the overall selection may remain unencumbered. Additional filters may be added by generating many KPI variants on top, which may then be used for more granular KPI monitoring. At the same time, a KPI may receive contextual filters from the surrounding application no matter if it is a dashboard with filters or an application user interface, which may need to transfer a process or object context to the relevant KPI. Any change the user is doing to the underlying base KPI may immediately impact all KPI variants on top. With this reliability and consistency of data selections may be increased and simplified.

Further, the current subject matter may provide a seamless end-to-end process monitoring. For example, the current subject may enable monitoring of business processes from the beginning and to the end. As stated above, KPIs may be generated as metadata objects, e.g., a report, reusing the same selection and filtering parameters. This may allow a key user to define overall selections of a KPI similar to any other analysis pattern. When defining KPI variants the same filter dialogs and relative selections may be used as in any other reporting situation.

Further, the key user approach, which may enable a dedicated user to centrally define corporate assets may be extended to KPIs both for KPI adaptations of standard KPIs as well as to custom KPIs and KPI variants. Moreover, the UI specification related to embedding KPIs into various interface pages as well as navigational capabilities allowing navigation from an aggregated information to operational details, including insight-to action paths, may be seamless.

FIG. 1 illustrates an exemplary system 100 for generating and using contextual and adaptable key performance indicators, according to some implementations of the current subject matter. The system 100 may include one or more user computing devices 102, a computing platform 104, one or more user interfaces 106, and one or more parameter databases/libraries 108. The computing platform 104 may include a parameter customization component 103, a parameter filtering component 105, and a parameter monitoring component 107.

The users 102, the computing platform 104, the user interfaces 106, and the parameter databases/libraries 108 may be communicatively coupled with one another using any type of network, including but not limited to, wired, wireless, and/or a combination of both. The users 102 may include at least one of the following: computer processors, computing networks, software applications, servers, user interfaces, and/or any combination of hardware and/or software components. Parameter databases/libraries 108 may include at least one of the following: databases, storage locations, memory locations, and/or any combination of hardware and/or software components.

The computing platform 104 may include any combination of software and/or hardware components and can be configured to receive and execute queries from one or more user devices 102 to process various data in accordance with various parameters (e.g., KPIs) and/or customized/filtered parameters. The parameters may be supplied to the computing platform 104 from the parameter database/library 108. The supplied parameters may be transmitted to the computing platform automatically, manually, based on upon a request associated with a particular user query and/or process being executed by the platform 104.

Execution of a query can typically require generation of a query plan or query execution plan, which can be an ordered set of operations that can be used to access stored data (e.g., access data in a SQL relational database management system). When a query is presented, a query optimizer may evaluate various plans for executing the query and may return what it considers the best possible plan. In some cases, database users and/or administrators may manually examine and/or configure the plans generated by the query optimizer to obtain better results/performance. The parameters that may be associated with execution of a particular query may be standard parameters received from the parameter database/library 108 and/or customized and/or filtered parameters generated by the computing platform 104.

The user interfaces 106 may be configured to present one or more outputs, e.g., reports that may be a result of a process executed by the platform 104. By way of a non-limiting example, in a call center scenario, where agents may be evaluated based on a number of calls that they take during a particular period of time (e.g., day, week, month, etc.), the user interfaces 106 may present a specific performance rate of each agent in accordance with a particular parameter that may be modified in accordance with that call center's settings. The modification of parameters may be contextual in nature, e.g., specific to the type of questions that the particular call center is designed to handle, number of available agents, etc.

Figure 2A:
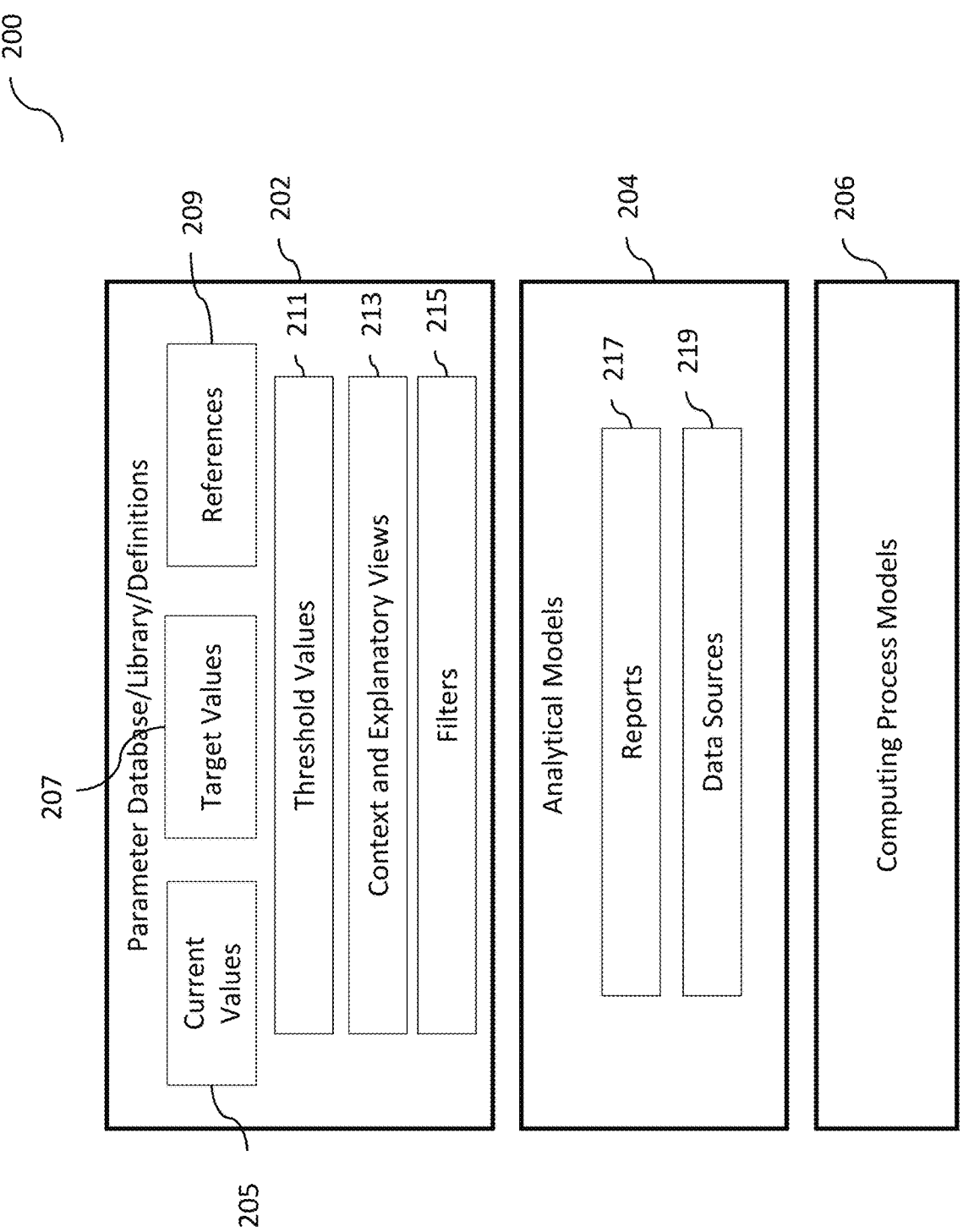
FIG. 2a illustrates exemplary structure of a standard parameter, according to some implementations of the current subject matter.

In some implementations, the parameter database/library 108 may be configured to transmit standard set of parameters (e.g., KPI) that may be generally relevant to one or more computing processes being executed by the computing platform 104. For example, as shown in FIG. 2a, the standard parameters 202 may be defined by one or more their current values 205, one or more of their target values 207, and/or one or more of their references 209. Additionally, standard definitions of parameters 202 may also include one or more threshold values 211, one or more context and/or explanatory views 213, and/or one or more filters 215. Current values 205 may represent current values of a particular parameter. Target values 207 may represent expected or future values for that parameter. Threshold values 211 may represent any minimum values for the same parameter. The context and/or explanatory views 213 may explain a specific setting that may be associated with that parameter. A relative logic may be used to determine one or more filters 215. By way of a non-limiting example, a manager in a sales unit of a company may be evaluated using data values of incoming orders in the last 3 months.

Figure 2B:
FIG. 2b illustrates an exemplary user interface that implements use of various parameters (e.g., KPIs), according to some implementations of the current subject matter.

In some implementations, in order to access specific data associated with a particular parameter, that, for example, may be called by a query, one or more analytical models 204 and/or one or more computing process models (e.g., business object models) 206 may be used. The models 204, 206 may depend on the type of data that is being sought. The analytical models 204 may use one or more reports 217 and/or one or more data sources 219 (e.g., databases). FIG. 2b illustrates an exemplary user interface 220 that implements use of various parameters (e.g., KPIs).

Figure 4:
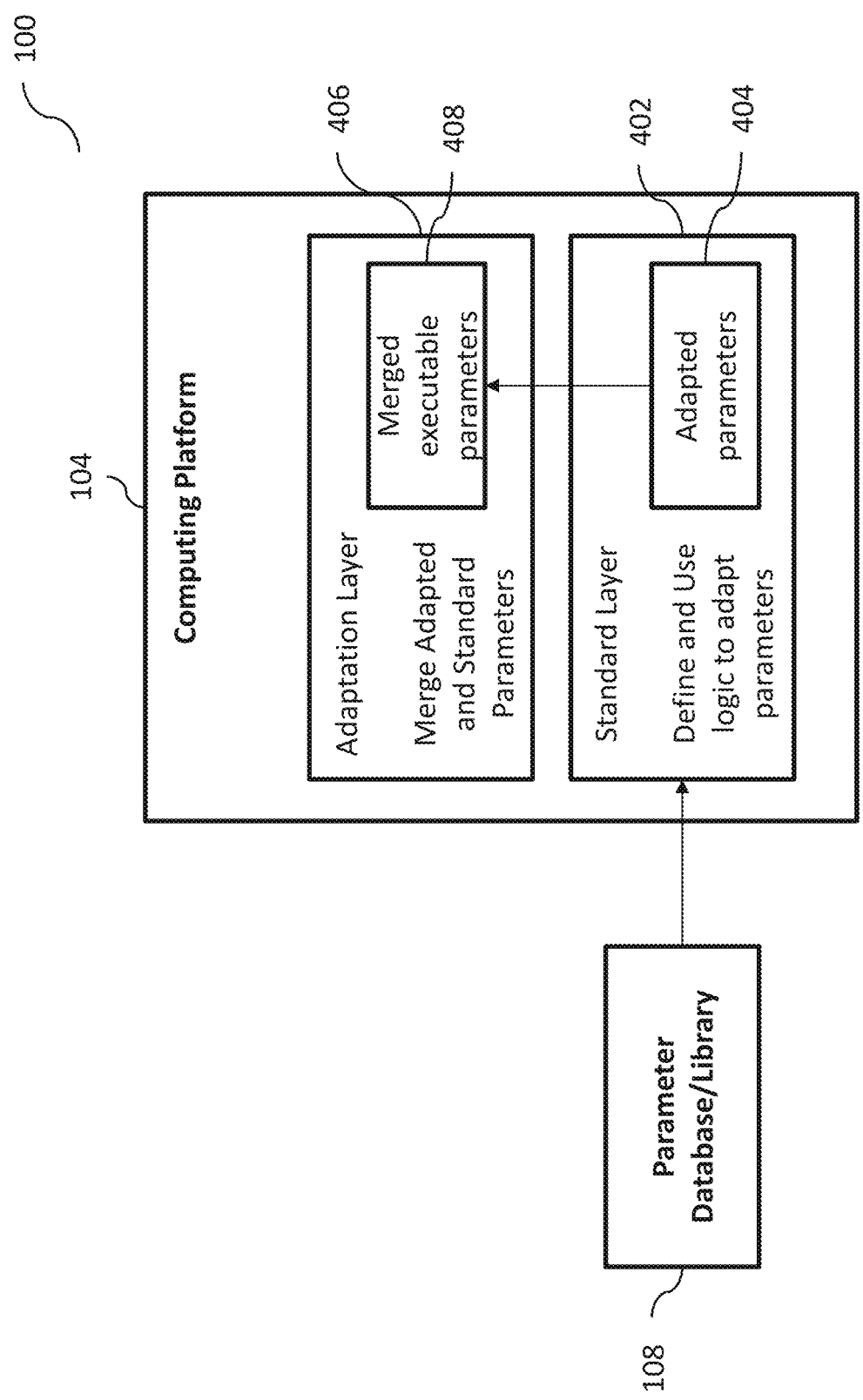
FIG. 4 illustrates the system shown in FIG. 1 in further detail, according to some implementations of the current subject matter.

FIG. 4 illustrates the system 100 shown in FIG. 1 in further detail. As shown in FIG. 4, the computing platform 104 may include a standard computing layer 402 and an adaptation layer 404. The layers 402, 404 may implement one or more components 103-107 shown in FIG. 1. In particular, the parameter database/library 108 may transmit standard parameters/definitions for one or more computing processes executed by the platform 104 to the standard layer 402. The standard parameters/definitions (e.g., KPIs) may be defined irrespective of a particular context or the platform 104 where the computing process may be executed (e.g., sales). The parameters/definitions may be defined in accordance with the structure shown in FIGS. 2a-b. The database/library 108 may be configured to continuously supply standard parameters/definitions to the standard layer 402. Alternatively, the parameters/definitions may be transmitted on periodic basis and/or upon receiving an appropriate request.

The standard layer 402 may determine whether or not to modify and/or adapt the standard parameters/definitions in accordance with a specific context associated with a specific computing process executed by the computing platform 104. Alternatively, no modification of the standard parameters/definitions may be performed by the computing platform 104 and the received parameters/definitions may be used in the original form (e.g., embedded into a user interface's dashboard, used to execute a function of the computing process, etc.).

Modification of the standard parameters/definitions may include altering various values (e.g., target values, thresholds, etc.) associated with the parameters/definitions. Moreover, one or more filters may be used or exposed for filtering the standard parameters/definitions. Filters may be defined in accordance with specific context of the computing process that is being executed by the computing platform 104. By way of a non-limiting example, filters may be defined to exclude certain sales data that is more than 3 months old when evaluating performance of a sales manager. Modification of standard parameters/definitions may be accomplished by specific logic that may be defined/used by the standard layer 402. The logic may be used to generate adapted and/or modified (and/or filtered) parameters 404.

The modified parameters 404 may be provided to the adaptation layer 406 of the computing platform 104. In some implementations, the adaptation layer 406 may be configured to define a logic to merge modified parameters 404 and the standard parameters/definitions received from the database/library 108 into executable parameters 408. The executable parameters 408 may then be used during execution of one or more computing processes by the platform 104.

Figure 5A:
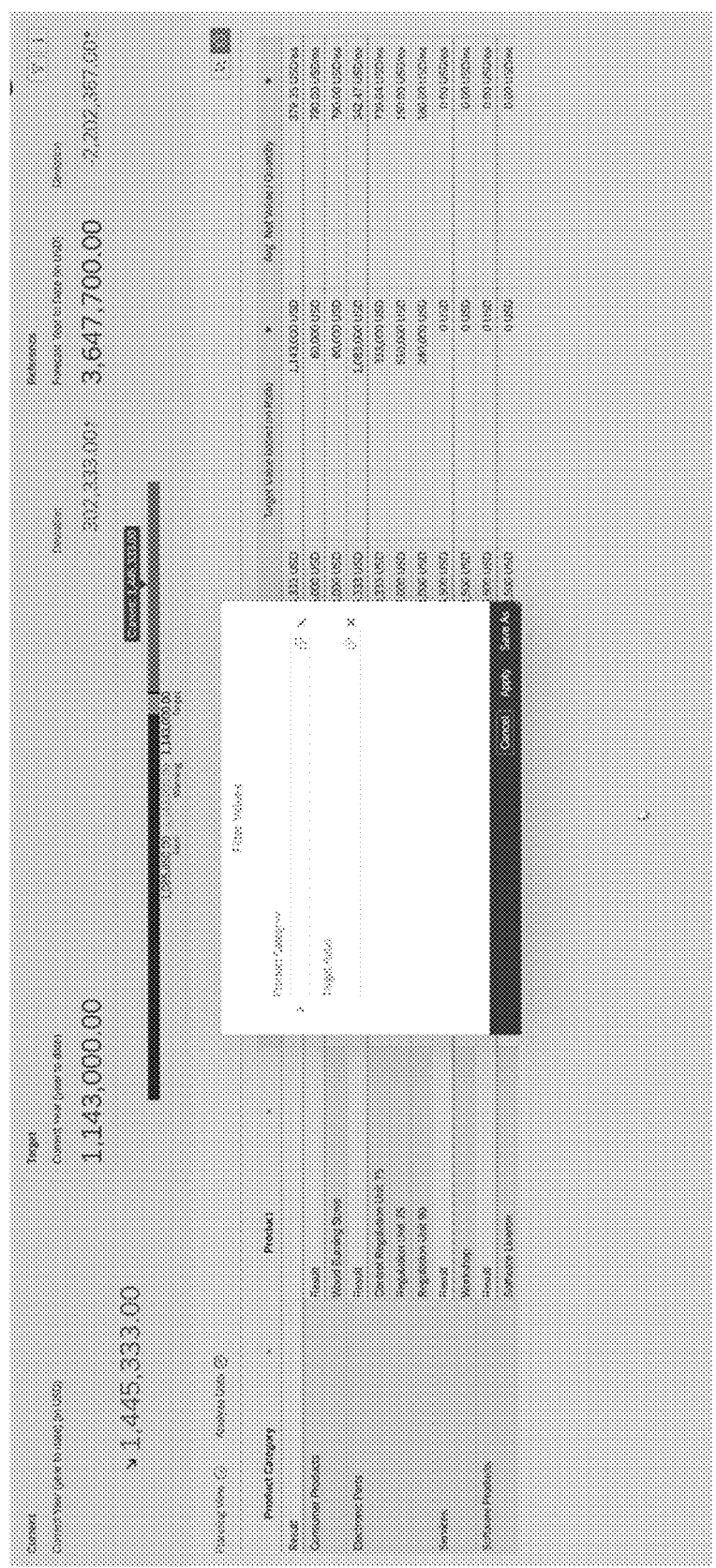
FIG. 5a illustrates an exemplary interface showing modified parameters, according to some implementations of the current subject matter.
Figure 5B:
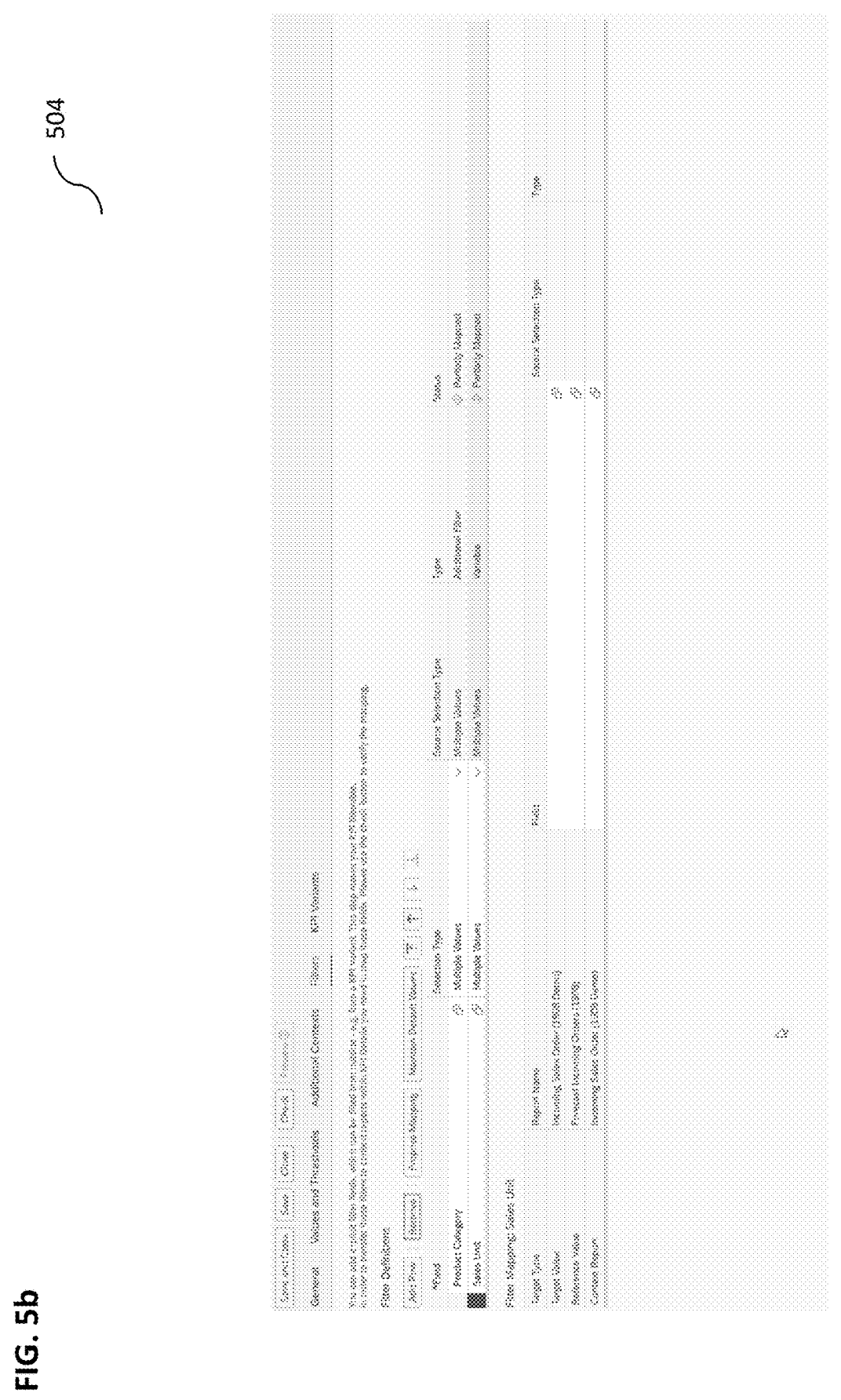

In some implementations, the platform 104 may be configured to monitor execution of its processes using the executable parameters 408 to determine whether such parameters may need to be updated. In particular, the platform 104 may determine that update to the parameters 408 may be needed in view of the newly received standard parameters from the parameter database/library 108. Alternatively, updated to the parameters 408 may be needed in view of changes in context and/or other requirements of the computing processes executed by the platform 104. FIG. 5a illustrates an exemplary interface 502 showing modified parameters, according to some implementations of the current subject matter. FIG. 5b illustrates an exemplary interface 504 showing exposed filters for a particular parameter (e.g., KPI), according to some implementations of the current subject matter.

Figure 6:
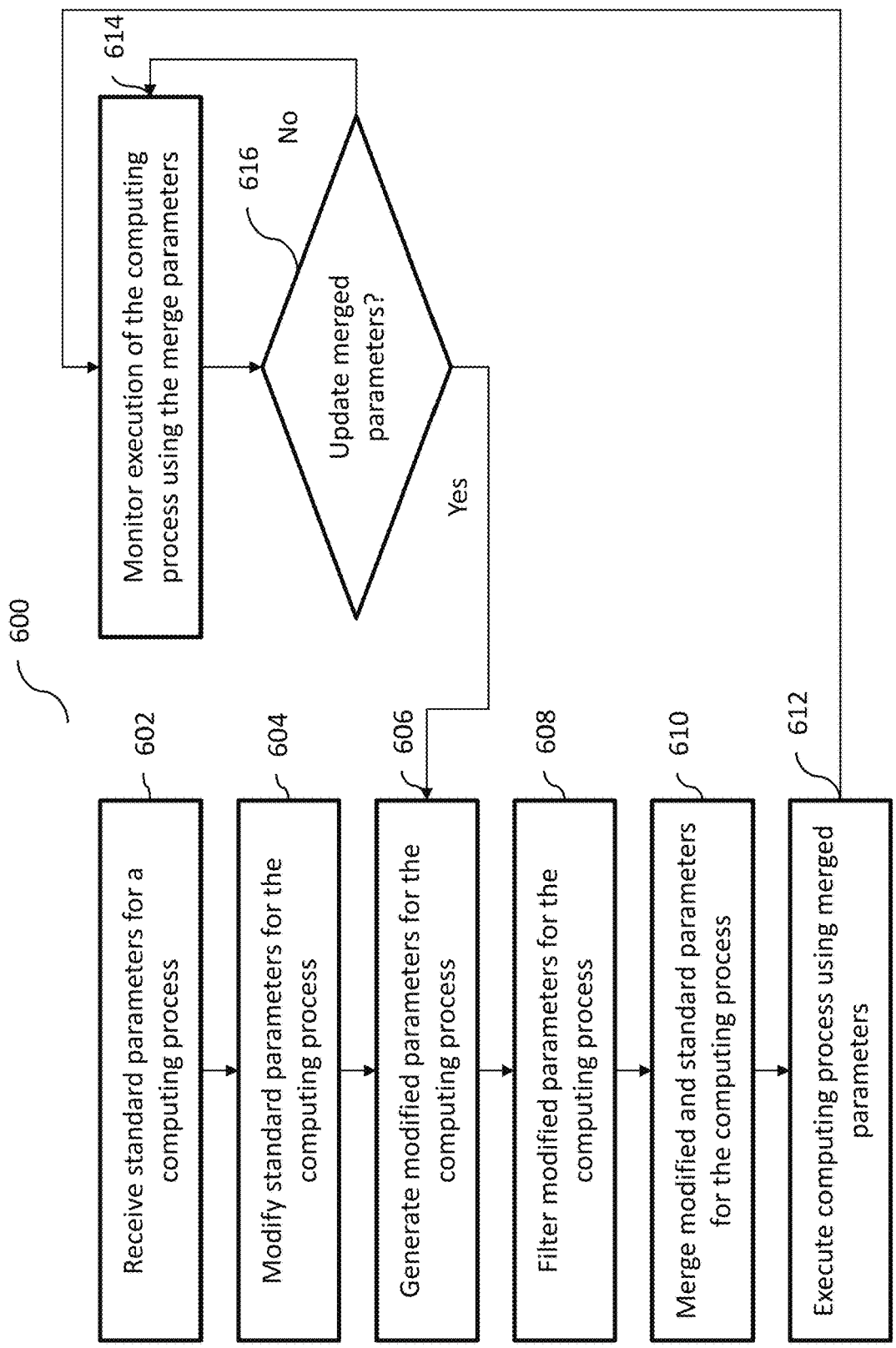
FIG. 6 illustrates an exemplary process for generation and use of contextual and adaptable key performance indicators (KPIs) that may be used for monitoring of various processes, according to some implementations of the current subject matter.

FIG. 6 illustrates an exemplary process 600 for generation and use of contextual and adaptable key performance indicators (KPIs) that may be used for monitoring of various processes, according to some implementations of the current subject matter. At 602, standard parameters associated with execution of a computing process may be received. The database/library 108 of the system 100 (shown in FIG. 1) may be configured to transmit such standard parameters to the computing platform 104 configured to execute the computing process. The standard parameters may be transmitted continuously, automatically, periodically and/or upon request. The standard parameters may include key performance indicators for the computing process.

At 604, the standard parameters may be modified by the platform 104 (e.g., using parameter customization component 103 shown in FIG. 1). The modification may be contextual. For example, it may be specific to the computing environment where the computing process is being executed. It may be specific to a particular data that is being used by the computing process. It may be also specific to that specific standard parameter. As can be understood, the standard parameter may be modified in accordance with any requirements by a user (e.g., user 102 shown in FIG. 1).

At 606, modified parameters for execution of the computing process may be generated. The modified parameters may also be filtered by exposing various filters within the platform 104, at 608. Filters may also be contextual in nature and/or may be specific to the particular computing process and/or computing environment.

At 610, the modified/filtered parameters may be merged with the standard parameters received from the database/library 108. The merger may occur with currently or previously received standard parameters and/or any subsequently received standard parameters. The computing platform 104 may generate executable versions of the merged parameters. At 612, the computing process may be executed using the merged parameters.

At 614, the computing platform 104 may monitor execution of the computing process using the merged parameters to determine whether modification of the merged parameters may be necessary, at 616. If not, the monitoring may continue, at 614. Otherwise, the processing goes back to 606, where further modification of the parameters may occur.

Figure 7:
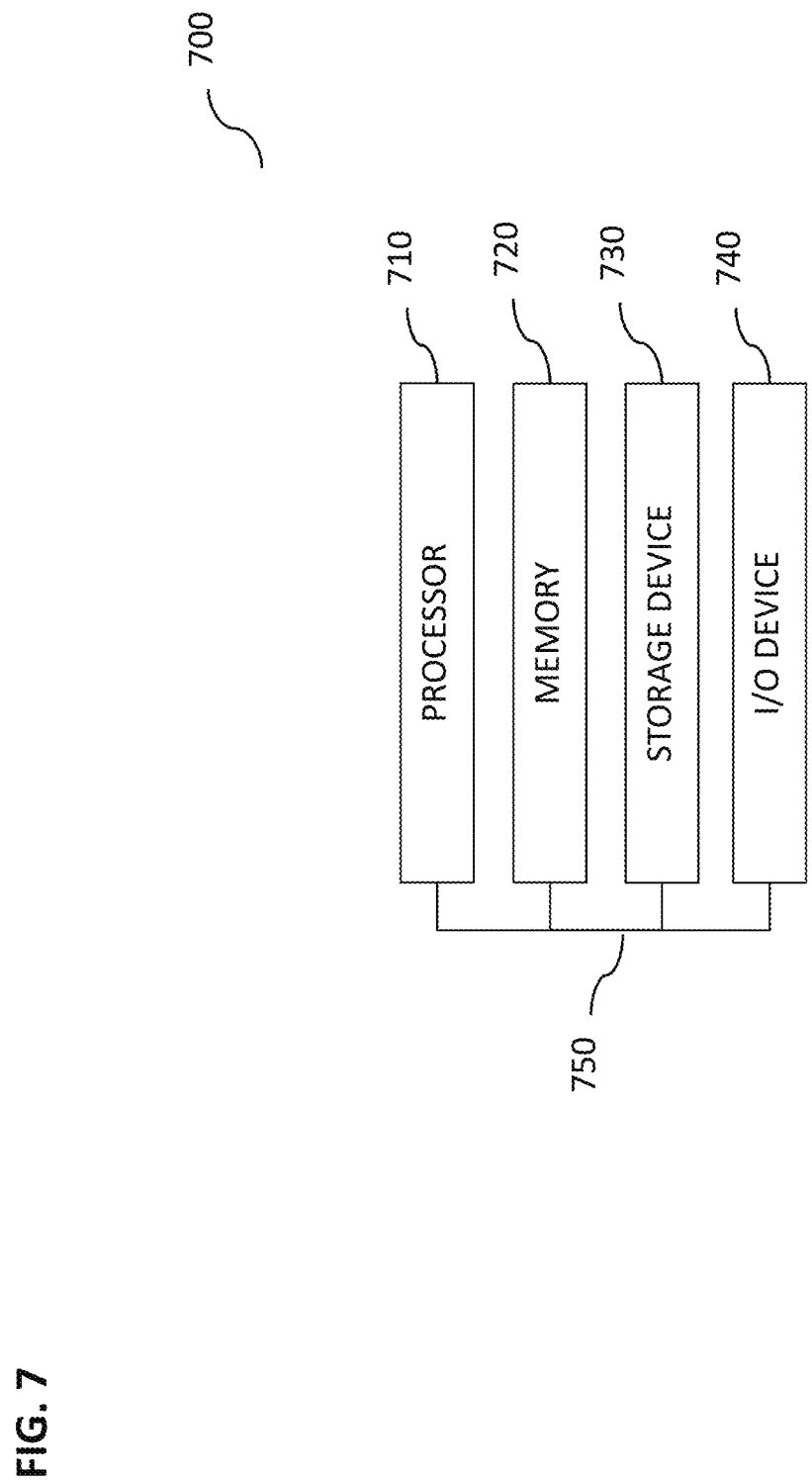
FIG. 7 is an exemplary system, according to some implementations of the current subject matter.

In some implementations, the current subject matter can be configured to be implemented in a system 700, as shown in FIG. 7. The system 700 can include a processor 710, a memory 720, a storage device 730, and an input/output device 740. Each of the components 710, 720, 730 and 740 can be interconnected using a system bus 750. The processor 710 can be configured to process instructions for execution within the system 700. In some implementations, the processor 710 can be a single-threaded processor. In alternate implementations, the processor 710 can be a multi-threaded processor. The processor 710 can be further configured to process instructions stored in the memory 720 or on the storage device 730, including receiving or sending information through the input/output device 740. The memory 720 can store information within the system 700. In some implementations, the memory 720 can be a computer-readable medium. In alternate implementations, the memory 720 can be a volatile memory unit. In yet some implementations, the memory 720 can be a non-volatile memory unit. The storage device 730 can be capable of providing mass storage for the system 700. In some implementations, the storage device 730 can be a computer-readable medium. In alternate implementations, the storage device 730 can be a floppy disk device, a hard disk device, an optical disk device, a tape device, non-volatile solid state memory, or any other type of storage device. The input/output device 740 can be configured to provide input/output operations for the system 700. In some implementations, the input/output device 740 can include a keyboard and/or pointing device. In alternate implementations, the input/output device 740 can include a display unit for displaying graphical user interfaces.

Figure 8:
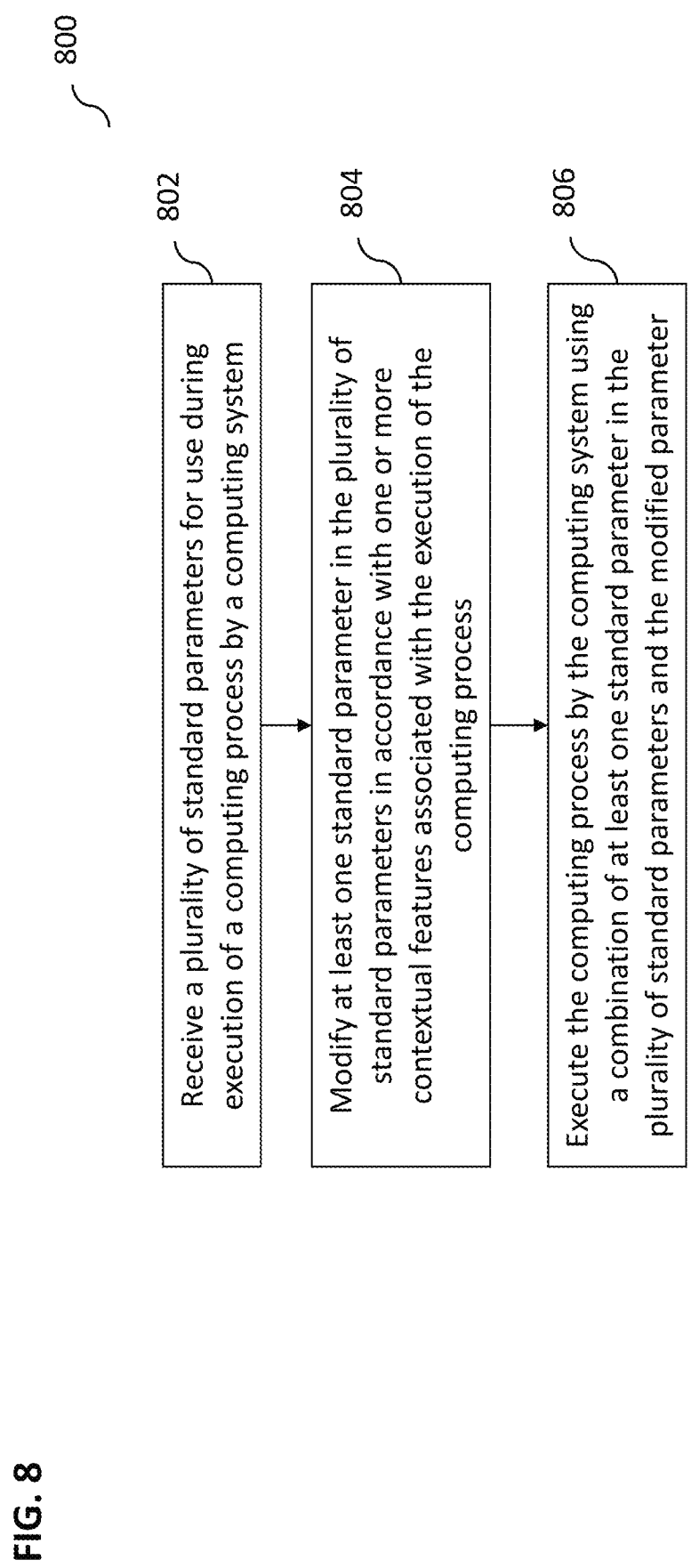
FIG. 8 is an exemplary method, according to some implementations of the current subject matter.

FIG. 8 illustrates an exemplary method 800 for generating and using contextual and adaptable parameters that may be used for monitoring of various processes, according to some implementations of the current subject matter. At 802, a plurality of standard parameters for use during execution of a computing process by a computing system may be received. As stated above, the standard parameters may be transmitted to the computing platform 104 by the database/library 108 (as shown in FIG. 1). At 804, at least one standard parameter in the plurality of standard parameters may be modified in accordance with one or more contextual features associated with execution of the computing process. At 806, the computing process may be executed by the computing system using a combination of at least one standard parameter in the plurality of standard parameters and the modified parameter.

In some implementations, the current subject matter can include one or more of the following optional features. In some implementations, the process may further include filtering the modified standard parameter using at least one filter associated with the execution of the computing process. Execution of the process may further include executing the computing process by the computing system using a combination of at least one standard parameter in the plurality of standard parameters and the filtered modified parameter.

In some implementations, the process may further include receiving a second plurality of standard parameters, and executing the computing process by the computing system using a combination of at least one standard parameter in the plurality of standard parameters, at least one parameter in the second plurality of standard parameters, and the modified parameter. The method may also include monitoring execution of the computing process using the combination of at least one standard parameter in the plurality of standard parameters and the modified parameter, performing additional modification of the modified parameter, and executing the computing process by the computing system using a combination of at least one standard parameter in the plurality of standard parameters and the additionally modified parameter.

In some implementations, the method may further include displaying result of the executing using at least one user interface of the computing system. Further, the standard parameters may include a key performance indicator associated with execution of the computing process.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
    receiving periodically a plurality a standard parameters for use during execution of a computing process by a computing system, the plurality of standard parameters are defined for use by the computing system, wherein at least one standard parameter is dependent on at least another standard parameter and the computing system, each standard parameter is defined by one or more current values, one or more target values and one or more contextual views, and one or more threshold values;
    automatically determining at least one standard parameter of the plurality of standard parameters to modify in accordance with one or more contextual features associated with the execution of the computing process;
    automatically modifying the determined at least one standard parameter of the plurality of standard parameters in accordance with the one or more contextual features associated with the execution of the computing process and the computing system, wherein the modifying includes changing one or more metadata definitions associated with each respective determined standard parameter of the plurality of standard parameters to generate one or more modified standard parameters comprising one or more filter fields, the modifying further including:
        modifying one or more rules defining one or more threshold values associated with the determined at least one standard parameter of the plurality of standard parameters; and
        modifying one or more filtering parameters of the one or more filter fields, for filtering the determined at least one standard parameter in the plurality of standard parameters and one or more modified standard parameters, wherein a filtering of the one or more modified standard parameters generates one or more further modified standard parameters, the one or more filter fields being used to generate at least one variant of at least one of the standard parameter, the modified standard parameters and further modified standard parameter;
    executing the computing process by the computing system using a merged combination of at least one standard parameter in the plurality of standard parameters, the at least one modified parameter, and the at least one further modified standard parameter, the at least one standard parameter, the at least one modified parameter, and the at least one further modified standard parameter are further continuously modified during the execution based on a monitoring of execution of the computing process in the computing system using the at least one standard parameter, the at least one modified parameter, and the at least on further modified standard parameter, wherein the computing system executes the computing process using a combination of the further continuously modified at least one standard parameter, at least one modified parameter, and the at least one further modified standard parameter.

2. The method according to claim 1, further comprises filtering the at least one modified standard parameter using at least one filter associated with the execution of the computing process.

3. The method according to claim 2, wherein the executing further comprises executing the computing process by the computing system using a combination of at least one standard parameter in the plurality of standard parameters and the at least one filtered modified parameter.

4. The method according to claim 1, further comprising receiving a second plurality of standard parameters; and executing the computing process by the computing system using a combination of at least one standard parameter in the plurality of standard parameters, at least one parameter in the second plurality of standard parameters, and the at least one modified parameter.

5. The method according to claim 1, further comprising monitoring execution of the computing process using the combination of at least one standard parameter in the plurality of standard parameters and the at least one modified parameter;
    performing additional modification of the at least one modified parameter; and executing the computing process by the computing system using a combination of at least one standard parameter in the plurality of standard parameters and the at least one additionally modified parameter.

6. The method according to claim 1, further comprising displaying result of the executing using at least one user interface of the computing system.

7. The method according to claim 1, wherein at least one standard parameter is a key performance indicator associated with execution of the computing process.

8. A system comprising:
at least one programmable processor; and
a non-transitory machine-readable medium storing instructions that, when executed by the at least one programmable processor, cause the at least one programmable processor to perform operations comprising:
receiving periodically a plurality of standard parameters for use during execution of a computing process by a computing system, the plurality of standard parameters are defined for use by the computing system, wherein at least one standard parameter is dependent on at least another standard parameter and the computing system, each standard parameter is defined by one or more current values, one or more target values and one or more contextual views, and one or more threshold values;
automatically determining at least one standard parameter of the plurality of standard parameters to modify in accordance with one or more contextual features associated with the execution of the computing process;
automatically modifying the determined at least one standard parameter of the plurality of standard parameters in accordance with the one or more contextual features associated with the execution of the computing process and the computing system, wherein the modifying includes changing one or more metadata definitions associated with each respective determined standard parameters of the plurality of standard parameters to generate one or more modified standard parameters comprising, one or more filter fields, the modifying further including:
modifying one or more rules defining one or more threshold values associated with the determined at least one standard parameter of the plurality of standard parameters; and
modifying one or more filtering parameters of the one or more filter fields, for filtering the determined at least one standard parameter in the plurality of standard parameters and one or more modified standard parameters, wherein a filtering of the one or more modified standard parameters generates one or more further modified standard parameters, the one or more filter fields being used to generate at least one variant of at least one of the standard parameter, the modified standard parameters and further modified standard parameter;
executing the computing process by the computing system using a merged combination of at least one standard parameter in the plurality of standard parameters, the at least one modified parameter, and the at least one further modified standard parameter, the at least one standard parameter, the at least one modified parameter, and the at least one further modified standard parameter are further continuously modified during the execution based on a monitoring of execution of the computing process in the computing system using the at least one standard parameter, the at least one modified parameter, and the at least on further modified standard parameter, wherein the computing system executes the computing process using a combination of the further continuously modified at least one standard parameter, at least one modified parameter, and the at least one further modified standard parameter.

9. The system according to claim 8, wherein the operations further comprise filtering the at least one modified standard parameter using at least one filter associated with the execution of the computing process.

10. The system according to claim 9, wherein the executing further comprises executing the computing process by the computing system using a combination of at least one standard parameter in the plurality of standard parameters and the at least one filtered modified parameter.

11. The system according to claim 8, wherein the operations further comprise
receiving a second plurality of standard parameters; and
executing the computing process by the computing system using a combination of at least one standard parameter in the plurality of standard parameters, at least one parameter in the second plurality of standard parameters, and the at least one modified parameter.

12. The system according to claim 8, wherein the operations further comprise
monitoring execution of the computing process using the combination of at least one standard parameter in the plurality of standard parameters and the at least one modified parameter;
performing additional modification of the at least one modified parameter; and
executing the computing process by the computing system using a combination of at least one standard parameter in the plurality of standard parameters and the at least one additionally modified parameter.

13. The system according to claim 8, wherein the operations further comprise displaying result of the executing using at least one user interface of the computing system.

14. The system according to claim 8, wherein at least one standard parameter is a key performance indicator associated with execution of the computing process.

15. A computer program product comprising a non-transitory machine-readable medium storing instructions that, when executed by at least one programmable processor, cause the at least one programmable processor to perform operations comprising:
receiving periodically a plurality of standard parameters for use during execution of a computing process by a computing system, the plurality of standard parameters are defined for use by the computing system, wherein at least one standard parameter is dependent on at least another standard parameter and the computing system, each standard parameter is defined by one or more current values, one or more target values and one or more contextual views, and one or more threshold values;
automatically determining at least one standard parameter of the plurality of standard parameters to modify in accordance with one or more contextual features associated with the execution of the computing process;
automatically modifying the determined at least one standard parameter of the plurality of standard parameters in accordance with the one or more contextual features associated with the execution of the computing process and the computing system, wherein the modifying includes changing one or more metadata definitions associated with each respective determined standard parameter of the plurality of standard parameters to generate one or more modified standard parameters comprising one or more filter fields, the modifying further including:

modifying one or more rules defining one or more threshold values associated with the determined at least one standard parameter of the plurality of standard parameters; and modifying one or more filtering parameters of the one or more filter fields, for filtering the determined at least one standard parameter in the plurality of standard parameters and one or more modified standard parameters, wherein a filtering of the one or more modified standard parameters generates one or more further modified standard parameters, the one or more filter fields being used to generate at least one variant of at least one of the standard parameter, the modified standard parameters and further modified standard parameter;

executing the computing process by the computing system using a merged combination of at least one standard parameter in the plurality of standard parameters, the at least one modified parameter, and the at least one further modified standard parameter, the at least one standard parameter, the at least one modified parameter, and the at least one further modified standard parameter are further continuously modified during the execution based on a monitoring of execution of the computing process in the computing system using the at least one standard parameter, the at least one modified parameter, and the at least on further modified standard parameter, wherein the computing system executes the computing process using a combination of the further continuously modified at least one standard parameter, at least one modified parameter, and the at least one further modified standard parameter.

16. The computer program product according to claim 15, wherein the operations further comprise filtering the at least one modified standard parameter using at least one filter associated with the execution of the computing process;

wherein the executing further comprises executing the computing process by the computing system using a combination of at least one standard parameter in the plurality of standard parameters and the at least one filtered modified parameter.

17. The computer program product according to claim 15, wherein the operations further comprise receiving a second plurality of standard parameters; and executing the computing process by the computing system using a combination of at least one standard parameter in the plurality of standard parameters, at least one parameter in the second plurality of standard parameters, and the at least one modified parameter.

18. The computer program product according to claim 15, wherein the operations further comprise monitoring execution of the computing process using the combination of at least one standard parameter in the plurality of standard parameters and the at least one modified parameter;

performing additional modification of the at least one modified parameter; and executing the computing process by the computing system using a combination of at least one standard parameter in the plurality of standard parameters and the at least one additionally modified parameter.

19. The computer program product according to claim 15, wherein the operations further comprise displaying result of the executing using at least one user interface of the computing system.

20. The computer program product according to claim 15, wherein at least one standard parameter is a key performance indicator associated with execution of the computing process.

* * * * *